US007895246B2

(12) United States Patent
Bauman et al.

(10) Patent No.: US 7,895,246 B2
(45) Date of Patent: Feb. 22, 2011

(54) COLLECTION BIN FOR DATA MANAGEMENT AND TRANSFORMATION

(75) Inventors: Thomas Robert Bauman, Redmond, WA (US); Doreen Nelson Grieb, Kirkland, WA (US); Robert Warren Piper, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 279 days.

(21) Appl. No.: 11/756,327

(22) Filed: May 31, 2007

(65) Prior Publication Data

US 2008/0301137 A1 Dec. 4, 2008

(51) Int. Cl.
*G06F 17/30* (2006.01)
(52) U.S. Cl. ...................................... 707/811; 707/705
(58) Field of Classification Search ..................... 707/1, 707/999.001, 755, 756, 705, 802, 809, 811
See application file for complete search history.

(56) References Cited

U.S. PATENT DOCUMENTS

| | | | | |
|---|---|---|---|---|
| 5,899,979 | A | 5/1999 | Miller et al. .................... | 705/9 |
| 6,202,062 | B1 | 3/2001 | Cameron et al. ................ | 707/3 |
| 6,760,423 | B1 * | 7/2004 | Todd ....................... | 379/202.01 |
| 7,103,154 | B1 * | 9/2006 | Cannon et al. .............. | 379/67.1 |
| 7,171,349 | B1 * | 1/2007 | Wakefield et al. .............. | 704/9 |
| 7,181,689 | B2 | 2/2007 | Mock et al. .................. | 715/703 |
| 7,313,617 | B2 * | 12/2007 | Malik et al. .................. | 709/225 |
| 7,469,280 | B2 * | 12/2008 | Simpson ...................... | 709/223 |
| 2002/0091709 | A1 * | 7/2002 | Jung ........................ | 707/104.1 |
| 2002/0116641 | A1 * | 8/2002 | Mastrianni ................... | 713/201 |
| 2003/0097361 | A1 * | 5/2003 | Huang et al. .................. | 707/10 |
| 2003/0212527 | A1 * | 11/2003 | Moore et al. ................. | 702/179 |
| 2003/0220795 | A1 * | 11/2003 | Arayasantiparb et al. ... | 704/275 |

(Continued)

FOREIGN PATENT DOCUMENTS

EP 1122672 A2 8/2001

(Continued)

OTHER PUBLICATIONS

McGoey-Smith, Chris, "Using Microsoft Outlook 2003—A Beginners Guide—Email and Calendars", 2003, pp. 22, accessed online at <http://www.poteauwebdesign.com/RWBC/Outlook.pdf> on May 1, 2009.*

(Continued)

*Primary Examiner*—Charles Rones
*Assistant Examiner*—Phuong-Thao Cao
(74) *Attorney, Agent, or Firm*—Shook Hardy & Bacon LLP

(57) ABSTRACT

An electronic collection bin is provided for assisting users in managing their personal information. The electronic collection bin provides a common location for collecting and organizing a user's information. The electronic collection bin may receive information items of varying data types and from disparate sources. After receiving an information item, the electronic collection bin analyzes the item to determine a suggested treatment, which may include conversion of the item to a new data type located at another location. A user may access the electronic collection bin, sort through the information items, and select placement of the information items. The user may view the suggested treatments of information items in the electronic collection bin and choose whether to accept the suggested treatments.

4 Claims, 5 Drawing Sheets

U.S. PATENT DOCUMENTS

| | | | |
|---|---|---|---|
| 2003/0233419 A1* | 12/2003 | Beringer | 709/206 |
| 2004/0196313 A1* | 10/2004 | Wynn et al. | 345/779 |
| 2004/0203947 A1* | 10/2004 | Moles | 455/466 |
| 2004/0243677 A1* | 12/2004 | Curbow et al. | 709/206 |
| 2005/0013104 A1 | 1/2005 | Feague | 361/679.3 |
| 2005/0027779 A1* | 2/2005 | Schinner | 709/200 |
| 2005/0050146 A1* | 3/2005 | Jani et al. | 709/206 |
| 2005/0066007 A1* | 3/2005 | Wieczorek et al. | 709/206 |
| 2005/0086303 A1* | 4/2005 | Ye et al. | 709/205 |
| 2005/0267864 A1* | 12/2005 | Pope et al. | 707/1 |
| 2005/0289016 A1 | 12/2005 | Horstmann | 705/27 |
| 2006/0020804 A1 | 1/2006 | Schleifer | 713/176 |
| 2006/0047770 A1* | 3/2006 | Marappan | 709/207 |
| 2006/0053133 A1* | 3/2006 | Parkinson | 707/101 |
| 2006/0069604 A1 | 3/2006 | Leukart | 705/9 |
| 2006/0074844 A1* | 4/2006 | Frankel et al. | 707/1 |
| 2006/0080468 A1* | 4/2006 | Vadlamani et al. | 709/250 |
| 2006/0143157 A1* | 6/2006 | Landsman | 707/2 |
| 2006/0167877 A1* | 7/2006 | Lee et al. | 707/7 |
| 2006/0195510 A1* | 8/2006 | McNally | 709/203 |
| 2006/0212286 A1* | 9/2006 | Pearson et al. | 704/9 |
| 2006/0212362 A1* | 9/2006 | Donsbach et al. | 705/26 |
| 2006/0217967 A1 | 9/2006 | Goertzen | 704/201 |
| 2006/0218224 A1* | 9/2006 | Agrawal et al. | 709/201 |
| 2006/0230115 A1* | 10/2006 | Brooke et al. | 709/206 |
| 2006/0234680 A1* | 10/2006 | Doulton | 455/412.1 |
| 2007/0130369 A1* | 6/2007 | Nayak | 709/246 |
| 2008/0077888 A1* | 3/2008 | Miksovsky | 715/963 |
| 2008/0126476 A1* | 5/2008 | Nicholas et al. | 709/203 |
| 2008/0134088 A1* | 6/2008 | Tse et al. | 715/810 |
| 2008/0161027 A1* | 7/2008 | Benco et al. | 455/466 |
| 2008/0207176 A1* | 8/2008 | Brackbill et al. | 455/413 |

FOREIGN PATENT DOCUMENTS

WO     WO0225513 A2     3/2002

OTHER PUBLICATIONS

Software Downloads Site, http://www.freedownloadmanager.org/downloads/anniversary_software/, WinPIM 8.01, YQSoft Inc, Nov. 2, 2005, www.winpim.com.

Open Source Applications Foundation, "What's Compelling About Chandler: A Current Perspective," http://www.osafoundation.org/Chandler_Compelling_Vision.htm.

Claris Organizer 2.0 (Claris Corp PIM upgrade) (Software Review) (Evaluation), http://findarticles.com/p/articles/mi_hb197/is_199701/ai_hibm1G118891327, Macworld, Jan. 1997, Tom Negrino.

KDE Kontact: Get Organized!, http://kontact.kde.org/, Kontact 1.2.4 released, Jan. 25, 2007; 5th Annual KDE PIM Developer Meeting, Jan. 12, 2007; 4th Annual KDE PIM Developer Meeting, Jan. 6, 2006; First Kontact book published, Aug. 22, 2005; Kolab 2 Unveiled, Jun. 20, 2005.

\* cited by examiner

COLLECTION BIN FOR DATA MANAGEMENT AND TRANSFORMATION

BACKGROUND

People often need assistance in maintaining, organizing, and retrieving vast amounts of personal information, such as appointments, birthdays, anniversaries, contacts, and to-do items that need to be completed. In response to this need, electronic information management tools, such as calendars, contacts lists, and to-do lists, have been developed to assist users in information management. These tools are designed to assist users such that less time may be spent organizing their information.

The large number and general availability of information management tools, however, has detracted from the benefit of such tools. In particular, users often have multiple devices and software applications for personal information management that use different ways of storing and organizing information. As a result, users' information often becomes distributed amongst the various devices and applications, preventing the users from having a unified source of information.

In some cases, users may try to maintain their information on a common device or using a common application or set of applications. However, it may be extremely time-consuming for users to get information in the correct location. Additionally, users often do not have access to their electronic information tools when they wish to add information items. Instead, they are forced to either try to remember to add the information later or may try to record the information in whatever form is currently available to them. For instance, users may send themselves emails, text messages, or leave themselves a voicemail. Sometimes, users may write themselves sticky notes with the information and hope the note is not lost before the information is added to their information management tool. Again, the result is that instead of having one location for storing and organizing their information, users have information located at numerous distinct and unconnected locations.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments relate to an electronic collection bin to assist users in managing their personal information. The electronic collection bin is configured to receive information items of varying data types and from disparate sources and to store the information for subsequent access by a user. Additionally, the electronic collection bin analyzes the information items in an attempt to determine a suggested treatment for each information item. Treatment of an item in the electronic collection bin may include conversion of the item to a new data type located at another location (e.g., an appointment within a calendar, a to-do item in a to-do list, a contact in a contacts list, or a list item in a project list). The user may access the electronic collection bin, sort through the information items, and select placement of the information items. The user may view the suggested treatments of information items in the electronic collection bin and choose whether to accept the suggested treatments.

BRIEF DESCRIPTION OF THE SEVERAL VIEWS OF THE DRAWING

The present invention is described in detail below with reference to the attached drawing figures, wherein.

DETAILED DESCRIPTION

Figure 1:
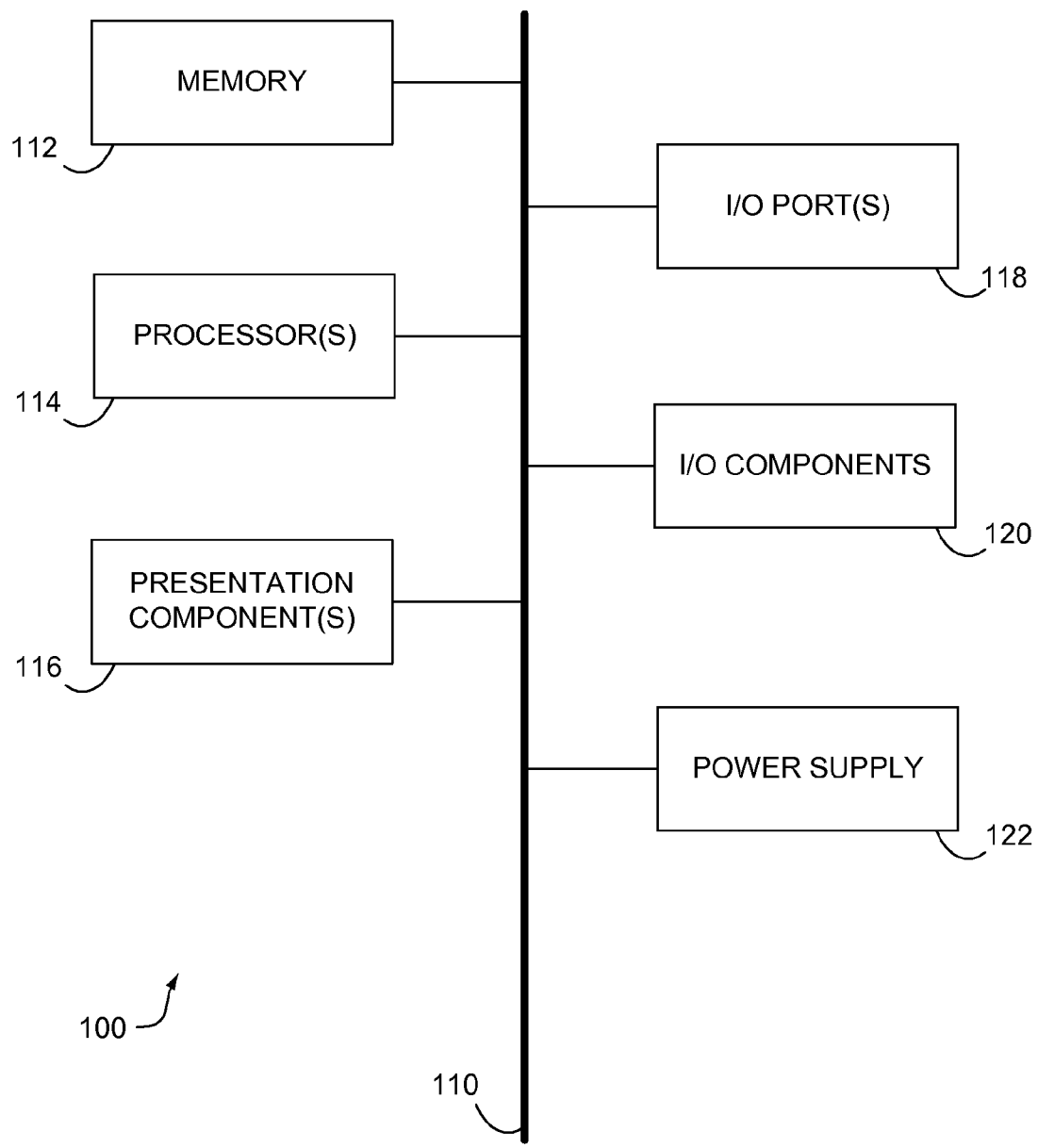
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide a collection bin that is a simple to use solution to quickly capture important information and prepare it for later use. The collection bin will accept information items of different types from a variety of different sources. For instance, the collection bin may accept direct typed text entry, ink (via a tablet PC), emails, instant messages (IMs), short message service (SMS) text messages, voicemails, links, pictures, and/or other file types.

Once information items have been captured, the collection bin assists in organizing the information by interpreting items or portions of items as specific data types, such as an appointment, a to-do item, or a contact, for instance, and provide suggested treatment of items based on the interpretation. A user may employ the collection bin to organize and sort the collected information. For instance, the user may search the collection bin for specific items, may tag items, and may sort items within the collection bin by various categories (e.g., by time of entry, time assigned, method of entry, file type, alphabetical order (referred to hereinafter as "alpha"), number of times viewed, tags, or user).

The user may choose to place collection bin items into other locations, such as a calendar, to-do list, contacts, projects, or lists, or simply leave them in the collection bin. In some embodiments, the user may view and accept a suggested treatment for an item within the collection bin, causing an item to be placed in another location (such as a calendar, to-do list, or a contacts list, for example) and, in some cases, the item is then removed from the collection bin.

Accordingly, the collection bin provides a common area for a user to capture and store a variety of different types of information from disparate sources. The user can then work through the information at his/her leisure and place the information at particular locations as the user sees fit. Additionally, the user is further assisted by automatic suggestions for placement of items within the collection bin.

Accordingly, in one aspect of the invention, an embodiment is directed to a computerized method for managing information. The method includes providing an electronic collection bin for receiving and storing information items of varying data types and from disparate sources. The method also includes receiving at least one information item at the electronic collection bin and storing the information item. The method further includes determining a suggested treatment for the information item. The method still further includes communicating the information item and the suggested treatment for the information item for presentation to a user.

In another embodiment of the invention, an aspect is directed to a computerized system including one or more computer-readable media having software components for providing an electronic collection bin. The software components include a receiving component, a suggestion component, and a presentation component. The receiving component is capable of receiving information items of varying data types from a plurality of disparate sources. The suggestion component is capable of determining a suggested treatment for an information item. The presentation component is capable of communicating the information items and the suggested treatment for an information item for presentation to a user.

A further embodiment of the invention is directed to one or more computer-readable media embodying computer-useable instructions for performing a method for organizing information. The method includes receiving an information item at an electronic collection bin configured to receive information items of varying data types from disparate sources. The method also includes determining a suggested treatment for the information item. The method further includes receiving a user selection accepting the suggested treatment for the information item. The method still further includes creating a new item at a location other than the collection bin based on the suggested treatment.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
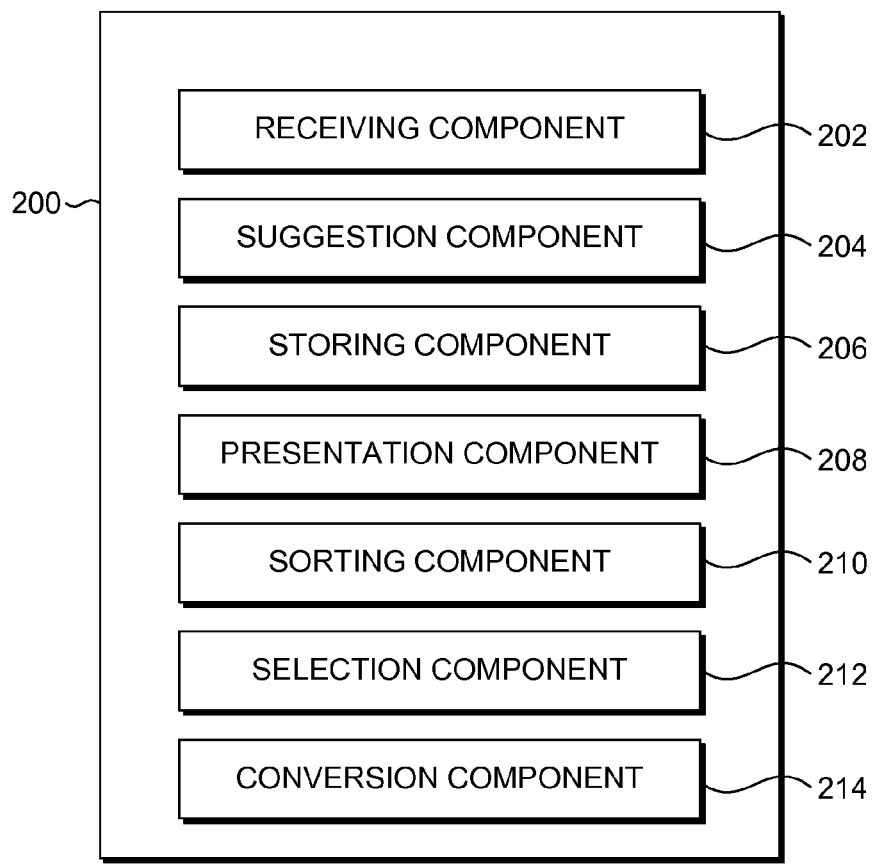
FIG. 2 is a block diagram of an exemplary computer system for providing a collection bin for use in implementing an embodiment of the present invention.

FIG. 2 illustrates an exemplary computer system 200 for providing a collection bin feature that receives and stores items and determines suggested data types for converting and placing collection bin items. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 2, the exemplary computer system 200 includes a receiving component 202, a suggestion component 204, a storing component 206, a presentation component 208, a sorting component 210, a selection component 212, and a conversion component 214. Computer system 200 may be included, for instance, within an application, web-based application, or operating system executing on a client-computing device, a server, or a combination thereof. While the receiving component 202, suggestion component 204, storing component 206, presentation component 208, sorting component 210, selection component 212, and conversion component 214 are illustrated as separate components in FIG. 2, one skilled in the art will appreciate that the components are scalable and may, in actuality, be combined into a single component or a plurality of components.

The receiving component 202 receives items to be added to the collection bin. Items may be added to the collection bin in a variety of different manners within the various embodiments of the present invention. Because the receiving component 202 is capable of receiving a wide variety of data types (e.g., emails, IMs, SMS text messages, items from a list, to-do items, to-do items on a calendar, appointments, contacts, etc) from a variety of disparate sources, the collection bin serves as a common place to collect a user's information.

By way of example only and not limitation, a user may type textual information directly into the collection bin. Additionally, a user may send an email, an instant message, or an short messaging service text message to the collection bin. The collection bin may also be configured to receive voice messages, allowing a user to add an item to the collection bin, for instance by using a phone to call a specific number for the collection bin and leave a voice message. In some embodiments, the collection bin may save the voice message as an audio file. In other embodiments, speech-to-text capabilities may be provided for converting the voice message to a textual item. Further, a user may add items to the collection bin by selecting and dragging information into the collection bin or copying and pasting information into the collection bin. For instance, a user may copy and paste items from a calendar, to-do list, contacts list, or other list into the collection bin. In some cases, the copied item remains in the original location, and only a copy of that item or a reference to that item is added to the collection bin. As such, treatment of the collection bin item (as will be discussed in further detail below) may affect the original item. Items may also be copied and pasted or dragged from a web page, including images, URLs, links, web address, text, and multimedia content. Additionally, any files from a desktop may be added. In still further embodiments, the receiving component 202 or an associated component may be configured to automatically add items to the collection bin. For instance, a user's email inbox could be scanned to identify items meeting predetermined conditions to add the items to the collection bin.

The suggestion component 204 interprets items received by the collection bin to determine suggestions regarding how items should be treated. In embodiments, the suggestion component 204 may employ a natural language input engine to analyze text within an item in the collection bin to determine suggested treatments for the item. In particular, the suggestion component 204 may determine that an item should be converted into a particular data type located at another location. For instance, the suggestion component 204 may analyze an item in the collection bin and determine that a new appointment, to-do item, contact, list item, or other data type should be created using information from the collection bin item and placed in a calendar, to-do list, contacts list, project list or other location. In some embodiments, suggestions made by the suggestion component 204 may be based at least in part on past user behavior. For instance, user behavior such as the manual conversion of collection bin items to particular data types by a user may be monitored, and information associated with this past user behavior may be used in the determination of suggested treatments for other collection bin items.

Figure 3:
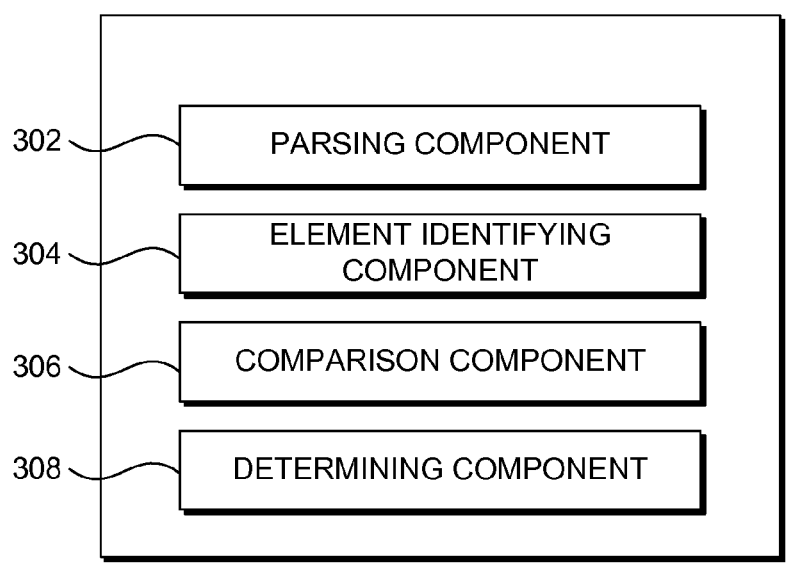
FIG. 3 is a block diagram of an exemplary suggestion component in accordance with an embodiment of the present invention.

A block diagram illustrating a suggestion component 300 in accordance with one embodiment of the invention is shown in FIG. 3. The suggestion component 300 includes a parsing component 302, an element identifying component 304, a comparison component 306, and a determining component 308. The parsing component 302 parses the text of an item in the collection bin. The element identifying component 304 analyses the parsed text and identifies various elements. For instance, the element identifying component 304 may identify portions of the parsed text as a date, a time, a person's name, a phone number, an address, a location, etc. The comparison component 306 compares the identified elements against known elements for various known data types, such as appointments, to-do items, and contacts. For instance, known elements for an appointment may include a date, a time, a location, and a subject. Based on the comparison of the elements identified for the collection bin item against known elements of various data types, the determining component 308 determines one or more suggested treatments for the item.

By way of example, suppose that a user sends an IM to his/her collection bin that includes the text: "business meeting, 5/5, 11:30 am, conference room 13A." The parsing component 302 parses the text and the element identifying component 304 determines the text "business meeting" is a subject, "5/5" is a date, "11:30 am" is a time, and "conference room 13A" is a location. The comparison component 306 compares these identified elements against known elements for known data types. As indicated above, for instance, known elements for an appointment may include a date, a time, a location, and a subject. Based on the comparison of the identified elements against the known elements, the determining component 308 determines that the creation of an appointment in the user's calendar using the information in the IM is an appropriate treatment.

In some cases, the suggestion component 300 may determine multiple treatments for a collection bin item. For instance, suppose in the above example, the IM includes the text "business meeting, 5/5, 11:30 am, conference room 13A, John Doe, 555-555-5555." The element identifying component 304 identifies "John Doe" as a name and "555-555-5555" as a phone number in addition to the identification of the other elements described above. The comparison component 306 compares the identified elements against known elements. Based on the comparison, the determining component 308 determines two treatments should be suggested for this item: the creation of a contact in the user's contact list in addition to the creation of an appointment in the user's calendar.

Referring again to FIG. 2, the storing component 206 stores the information received by the receiving component 202 in a database or like storage device. Additionally, the storing component 206 may store suggested treatments for items as determined by the suggestion component 204. It should be understood by one skilled in the art that information may be stored at a variety of different locations, for instance, locally on client device, on a server or other network device, and/or on several client devices (e.g., in peer-to-peer relationship).

The presentation component 208 presents collection bin items to a user, for instance, when a user accesses the collection bin. In some embodiments, the items are presented with an indication of suggested treatments as determined by the suggestion component 204. One skilled in the art will recognize that a user may access a collection bin in a variety of different manners within the scope of embodiments of the present invention. By way of example only and not limitation, a user may access the collection using a collection bin button in a toolbar, within a sidebar of an application, and/or a floating gadget on a user's desktop. Additionally, the presentation component 208 may support multiple views, such as a list/thumbnail view that includes a concise representation of items in the collection bin. Additionally, the presentation component 208 may support a full view that renders all the content exactly the way the items originally appeared.

The sorting component 210 allows a user to organize and work with items in the collection bin. In some embodiments, the sorting component 210 may allow a user to sort items in the collection bin by various categories, such as, for instance, by time of entry, time assigned, method of entry, file type, alpha, number of times viewed, tags, or user. Additionally, in some embodiments, the sorting component 210 allows users to quickly access items by providing the capability to search items in the collection bin based on user-provided search terms. In further embodiments, a user may designate a currently active project, such that all items added to the collection bin are sent to the active project until the user switches projects.

The selection component 212 allows a user to select treatment of items within the collection bin. The selection component 212 may allow a user to edit the collection bin by selecting items to delete, cut, copy, or paste. Additionally, the selection component 212 allows users to select suggested treatments for items. In particular, as indicated above, the suggestion component 204 analyzes collection bin items and determines suggested treatments. The user may review the suggested treatments and accept or reject them using the selection component 212. In some embodiments, the selection component 212 allows the user to deliberately move items from the collection bin to another desired location (e.g., a calendar, a contacts list, a project list, or a to-do list), for instance, by simply dragging the item to the desired location.

The conversion component 214 converts an item or information contained within an item to a particular data type based on a selection received by the selection component 212. Conversion of a collection bin item to a particular data type may comprise the creation of a new data type at an appropriate location. For instance, a collection bin item may be converted be creating an item on a list, a to-do item in a to-do list, a to-do item on a calendar, an appointment in a calendar, and/or a contact in a contacts list. In an embodiment, elements identified within a collection bin item are used to populate elements of the data type to which the collection bin item is being converted. For instance, in the previous example in which a collection bin item is an IM that includes the text: "business meeting, 5/5, 11:30 am, conference room 13A," an appointment may be created in the user's calendar with "business meeting" as the subject, "5/5" as the date, "11:30 am" as the time, and "conference room 13A" as the location. In some embodiments, when a collection bin item is converted to a new data type, the collection bin item is removed from the collection bin.

Figure 4:
FIG. 4 is table illustrating exemplary conversion of collection bin items in accordance with an embodiment of the present invention.

In some embodiments, the conversion component 214 converts collection bin items that have been received as a specific data type to a new data type. For instance, in FIG. 4, a table is provided illustrating the conversion of a collection bin item from one data type shown in column 402 to a new data type shown in row 404. In particular, the table illustrates the conversion of an item on a list, a to-do item in a to-do list, a to-do item in a calendar, a calendar appointment, or a contact to another of these data types.

Figure 5:
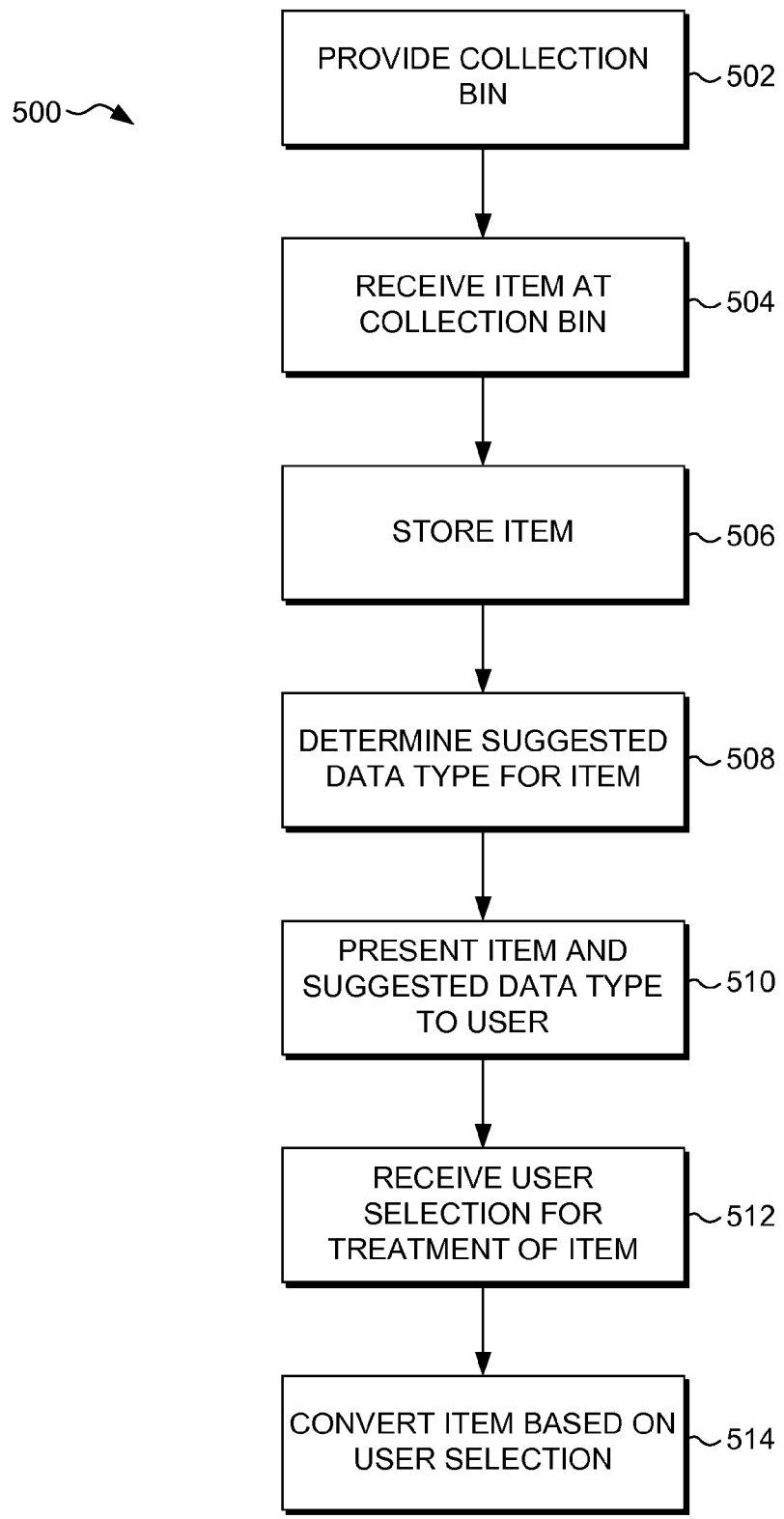
FIG. 5 is a flow diagram showing an exemplary method for receiving and managing collection bin items including providing suggested treatments for collection bin items in accordance with an embodiment of the present invention.

Referring now to FIG. 5, a flow diagram is provided showing a method 500 for receiving an item at a collection bin and determining a treatment for the item in accordance with an embodiment of the present invention. Initially, as shown at block 502, a collection bin configured to receive items of varying data types from a number of disparate sources is provided. As such, the collection bin can serve as a common place to collect a user's information. As shown at block 504, an information item is received at the collection bin. At block 506, the received item is stored in a storage location provided for the collection bin. Additionally, as shown at block 508, a suggested treatment is determined and stored for the received item. The suggested treatment may include the creation of a particular data type, such as, for instance, an item on a list, a to-do item, a to-do item on a calendar, a calendar appointment, and/or a contact. As previously indicated, in some cases, a suggested treatment for a collection bin item may include the creation of multiple data types (e.g., both an appointment and a contact).

When a user accesses the collection bin, items that have been received by the collection bin and determined suggested treatments for the items are presented to the user, as shown at block 510. The user may then work through the items as desired. For instance, the user may search for particular items or may sort the items by a particular category, such as time of entry, time assigned, method of entry, file type, alpha, number of times viewed, tags, or by user. As shown at block 512, the user selects a treatment of a collection bin item. In some cases, the user may chose to accept a treatment suggested by the collection bin. In other cases, the user may choose to decline a suggested treatment and select another treatment. In still further cases, the collection bin may have been unable to determine a suggested treatment, but the user may specify a treatment. Based on the user's selection, the collection bin item is converted to a particular data type (e.g., an item on a list, a to-do item, a to-do item on a calendar, a calendar appointment, and/or a contact) at a particular location (e.g., a to-do list, a calendar, a contacts list, and/or other list), as shown at block 514.

Embodiments of the present invention will now be further illustrated through the description of several specific user scenarios. Suppose, for instance, that while at work, Sally receives a call from an important client who wishes to have a dinner meeting with her on a Monday next month. Sally quickly types the appointment as an IM to her collection bin: "Dinner with Lynn Jacobs December 18 6 pm." The collection bin receives the message, adds it to the calendar, and sends back an IM receipt: "Appointment added to Calendar: Dinner with Lynn Jacobs, December 18th at 6 pm." Later when Sally accesses the collection bin, she sees her IM in the collection bin. Scrolling over it opens a thumbnail showing the appointment added to the calendar and an OK button. She clicks the OK button, and the appointment IM is deleted from the collection bin.

As another user scenario example, Brad is researching a family trip to Florida during Winter break. As he surfs the web, he drags and drops pictures of hotels and beaches, links for theme parks and coupons for car rental and airfare into the collection bin. Later he tags the items with the words "FL trip" and the collection bin adds them all to a list or project with that name.

As a further example, suppose that on his way to an appointment, Brad sees a billboard advertising Project Gotham Racing III and it occurs to him that the game would make an excellent birthday present for his son Trevor. He dials his collection bin using his cell phone and leaves a voice message for himself. Voice recognition software renders the voice message into text. Later when he accesses the collection bin, he views the text item corresponding with the voice message and discovers that the collection bin has added a link based on the phrase "Project Gotham Racing." He uses the link and purchases the game online with time to spare before Trevor's birthday.

Figure 6:
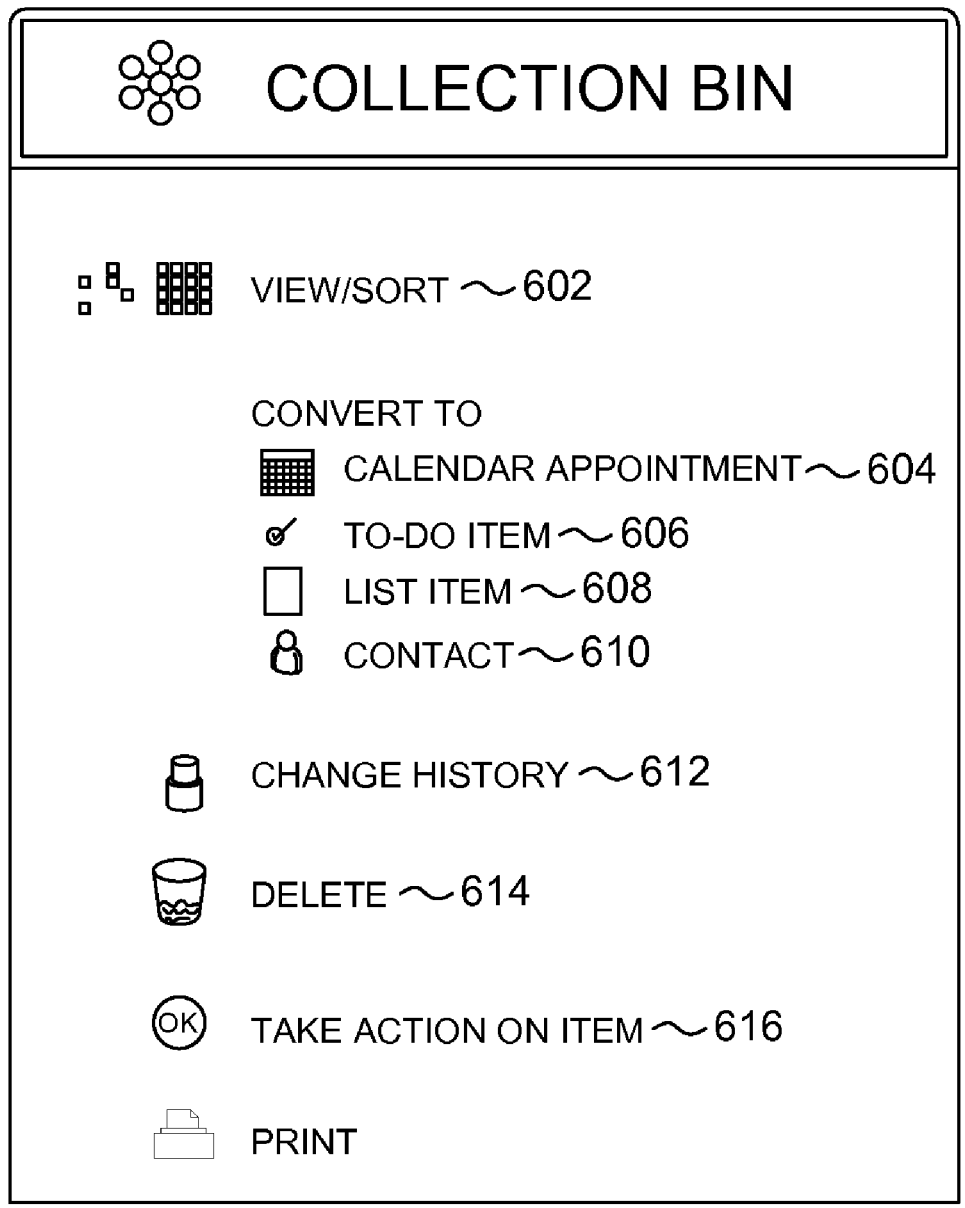
FIG. 6 is an illustrative user interface element facilitating user interaction with collection bin items in accordance with an embodiment of the present invention.

Turning now to FIG. 6, a user interface element 600 for facilitating user interaction with collection bin items in accordance with an embodiment of the invention is illustrated. It should be understood that the user interface element 600 shown in FIG. 6 is provided for illustrative purposes only and should not be viewed as limiting. A user may select view/sort 602 to view and sort the collection bin items. As indicated previously, collection bin items may be sorted in a variety of different manners, such as, for instance, by time of entry, time assigned, method of entry, data type (e.g., calendar appointment, to-do item, list item, contact, etc.), alpha, number of times viewed, tags, or user.

As the user works through the collection bin items, the user may chose to convert each collection bin item to a particular data type. In some cases, suggested data types may be automatically indicated for collection bin items, and the user may accept the suggested data type or select a different data type. As shown in the user interface element 600, a user may select a particular collection bin item and also select whether to convert the item to a calendar appointment 604, to-do item 606, list item 608, or contact 610. It should be understood that the data types indicated for conversion of a collection bin item shown in FIG. 6 are provided for illustrative purposes only and should not be viewed as limiting. A user may also choose to delete 614 items from the collection bin. Further, users may take actions on items 616 in the collection bin, such as placing a call, sending an email, sending an instant message, or sending a text message, for instance.

In some embodiments, changes made as users work through collection bin items may be tracked. In particular, these changes include actions such as converting a collection bin to a particular data type, deleting collection bin items, and taking actions on collection bin items. In the event that multiple users have access to a common collection bin, the changes may be tracked on a per user basis. A user may view the tracked changed by selecting the change history 612.

As can be understood, embodiments of the present invention provide a collection bin for receiving and storing different types of information from disparate sources. The collection bin analyzes items and determines suggested treatments for the times. A user may employ the collection bin to organize the information and place information items manually or using the suggested treatments.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media embodying computer-useable instructions for performing a method for organizing information, the method comprising:
    receiving from a user at an electronic collection bin an electronic information item that comprises text embodied as a first item type;
    determining that the text includes a combination of a subject, a date, a time, and a location;
    matching the combination of the subject, the date, the time, and the location to a known combination of categories, wherein, based on past behavior of the user, which includes manual conversion to an appointment, the known combination is defined to comprise elements of an appointment item type;
    responsive to the matching of the combination to the known combination, presenting to a user the text, which was included in the electronic information item, together with a suggestion that the text be transformed to an appointment item;
    receiving a user selection of the suggestion; and
    creating the appointment item, which includes the text embodied as the appointment item type, wherein the appointment item is organized in an electronic information management tool other than the collection bin.

2. The one or more computer storage media of claim 1, wherein receiving the electronic information item includes receiving a voice message that is converted to a textual item.

3. The one or more computer storage media of claim 1 comprising:
    matching the combination of the subject, the date, the time, and the location to a second known combination that is defined to comprise elements of a to-do-list item type, and
    responsive to matching the combination to the second known combination transforming the text into a to-do-list item.

4. The one or more computer storage media of claim 1, wherein the method further comprises removing the electronic information item from the collection bin.

* * * * *